US007318392B2

(12) United States Patent
Rosen et al.

(10) Patent No.: US 7,318,392 B2
(45) Date of Patent: Jan. 15, 2008

(54) PROTECTIVE WRAP AROUND ENCASEMENT FOR A PET CARRIER

(76) Inventors: Patricia A. Rosen, 17 Thistle La., Wilton, CT (US) 06897; Gabrielle N. Rosen, 360 W. 34th St. # 108, New York, NY (US) 10001

( * ) Notice: Subject to any disclaimer, the term of this patent is extended or adjusted under 35 U.S.C. 154(b) by 0 days.

(21) Appl. No.: 10/995,732

(22) Filed: Nov. 22, 2004

(65) Prior Publication Data

US 2006/0107902 A1    May 25, 2006

(51) Int. Cl.
*A01K 1/00* (2006.01)
(52) U.S. Cl. ............... 119/497; 119/416; 119/453; 119/452; 119/470; 119/482; 119/496; 220/9.4; 150/154; 383/26; 383/10; 383/75
(58) Field of Classification Search ........... 119/497, 119/416, 453, 452, 454, 470, 482, 496; D30/108–120; 220/9.4; 150/154–167; 383/4, 26, 10, 72, 383/75, 119, 907, 102, 117
See application file for complete search history.

(56) References Cited

U.S. PATENT DOCUMENTS

| | | | | |
|---|---|---|---|---|
| 606,332 | A | * | 6/1898 | Cummins .................. 150/154 |
| 857,435 | A | * | 6/1907 | Bell ........................ 206/521.1 |
| 2,711,234 | A | * | 6/1955 | Rubens ...................... 190/26 |
| 3,729,038 | A | * | 4/1973 | Ekeson ..................... 190/110 |
| 4,010,880 | A | * | 3/1977 | Guillot-Munoz .......... 224/275 |
| 4,788,935 | A | * | 12/1988 | Bella et al. ............... 119/168 |
| 4,803,951 | A | | 2/1989 | Davis |
| 4,957,246 | A | * | 9/1990 | Kantor ...................... 206/233 |
| 5,027,748 | A | * | 7/1991 | Wolak ....................... 119/168 |
| 5,113,793 | A | | 5/1992 | Leader et al. |
| 5,351,646 | A | * | 10/1994 | Zoroufy .................... 119/497 |
| 5,439,727 | A | * | 8/1995 | Riggs et al. ............... 428/128 |
| 5,485,805 | A | | 1/1996 | Meissner |
| 5,669,331 | A | * | 9/1997 | Richmond ................. 119/497 |
| 5,881,678 | A | * | 3/1999 | Morley ..................... 119/496 |
| 5,922,437 | A | * | 7/1999 | Bryant ...................... 428/102 |
| 5,954,014 | A | * | 9/1999 | Wamsley .................. 119/497 |
| D432,740 | S | * | 10/2000 | Morley ..................... D30/119 |
| 6,142,192 | A | * | 11/2000 | Dickinson et al. .......... 141/97 |
| 6,155,206 | A | * | 12/2000 | Godshaw .................. 119/453 |

(Continued)

FOREIGN PATENT DOCUMENTS

JP       10323139 A  *  5/1997

*Primary Examiner*—Andrea M. Valenti
(74) *Attorney, Agent, or Firm*—David Aker (57) ABSTRACT

A protective encasement or wrap for a pet carrier for helping prevent drafts and to provide water resistance, includes a cover member which can be of one piece of material, that when laid out on a flat surface, and with the animal carrier placed in its center, will wrap around the carrier, overlapping at the carrier top. The ends that overlap at the top, and along the side border each has a cutout for providing for the insertion of a handle of a carrier. The material is sized such that there is sufficient overhang at either end of the carrier to close off either end. A drawstring, or elastic at the ends, when not completely closed, provides an opening into the interior, permitting opening of the carrier door, and insertion of a hand to pet the animal, provides air circulation, insertion of items, or to remove the pet, without the need to remove the wrap.

19 Claims, 5 Drawing Sheets

U.S. PATENT DOCUMENTS 6,446,577 B1    9/2002    Salahor
6,581,545 B1 *    6/2003    Foster ........................ 119/482
D515,746 S *    2/2006    Sequino ..................... D30/119
2002/0189730 A1 *    12/2002    Garofalo et al. ............. 150/154
2005/0211589 A1 *    9/2005    Holzhaus ..................... 206/423

* cited by examiner

FIG. 1 FRONT

FIG. 2 BACK

PROTECTIVE WRAP AROUND ENCASEMENT FOR A PET CARRIER

BACKGROUND OF THE INVENTION

1. Field of the Invention

The present invention relates to protective wraps or encasements for pet carriers. More particularly, it pertains to a new protective wrap or encasement for a pet carrier for helping prevent drafts and precipitation from entering the carrier while transporting an animal within a pet carrier.

2. Background Art

The protective wraps or encasements for pet carriers as known and used in the prior art are know as slip covers for pet carriers. More specifically, coverings for pet carriers heretofore devised and utilized are known to consist basically of familiar, expected and obvious structural configurations, notwithstanding the myriad of designs encompassed by the crowded prior art which have been developed for the fulfillment of countless objectives and requirements.

Known prior art slip covers for pet carriers include U.S. Pat. No. 5,113,793; U.S. Pat. No. 5,954,014; U.S. Pat. No. 4,803,951; U.S. Pat. No. 6,446,577; U.S. Pat. No. 5,485,805. While these devices generally fulfill their respective, particular objectives and requirements, the devices disclosed in the aforementioned patents do not generally provide complete protection for an animal. Specifically, there is generally no coverage for the bottom surface of the carrier in the area where the pet will be resting during transport, and if this is not covered, when the carrier is placed on a cold surface, the animal within may become chilled. In addition generally these prior art devices have openings which permit extraneous noises to enter the carrier, and which noises may startle the animal during transport.

SUMMARY OF THE INVENTION

It is a general object of the present invention to provide a new protective wrap for a pet carrier for helping prevent drafts and precipitation to enter the carrier while transporting an animal within a pet carrier.

It is an object of the present invention to provide a new protective wrap for a pet carrier which overcomes the disadvantages normally associated with the prior art.

It is an object of the invention to provide a new protective wrap for a pet carrier which may be easily and efficiently manufactured and marketed.

It is another object of the invention to provide a new protective wrap for a pet carrier which is susceptible of a low cost of manufacture with regard to both materials and labor, and which accordingly is then susceptible of low prices of sale to the consuming public, thereby making such protective wrap for a pet carrier economically available to the buying public.

It is a further object of the invention to provide a new protective wrap for a pet carrier which is of a durable and reliable construction.

Still yet another object of the present invention is to provide a new protective encasement for a pet carrier that helps reduce the stress and trauma on an animal within a pet carrier while transporting the animal, especially while driving in a vehicle by covering most openings in the pet carrier.

The inventive device includes a protective wrap member having a piece of material large enough to completely wrap around a pet carrier, completely enclosing it on the top, bottom, sides, and having a drawn closure at the front and back of the carrier. The material is sized and shaped so as to when appropriate measures are taken, the wrap forms an interior cavity. The front and back end borders of the encasement have a drawstring, elastic or combination thereof which when appropriately drawn and fastened with a fabric fastener, can be substantially completely closed or have a variably sized opening, for providing a front opening into the interior cavity. The portion of the encasement where the side end borders overlap, and are positioned on the top surface of the pet carrier, also includes a slot that opens into the interior cavity for permitting insertion of a handle of a pet carrier therethrough.

In these respects, the protective wrap for a pet carrier according to the present invention substantially departs from the conventional concepts and designs of the prior art, and in so doing provides an apparatus primarily developed for the purpose of helping prevent drafts and precipitation from entering the carrier while transporting an animal within a pet carrier. If desired, the wrap may have a decorative and/or informative design thereon to make the combination more attractive, or to provide information as to the nature of the pet being transported, and how to help assure safety for the pet and those transporting the pet.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 1:
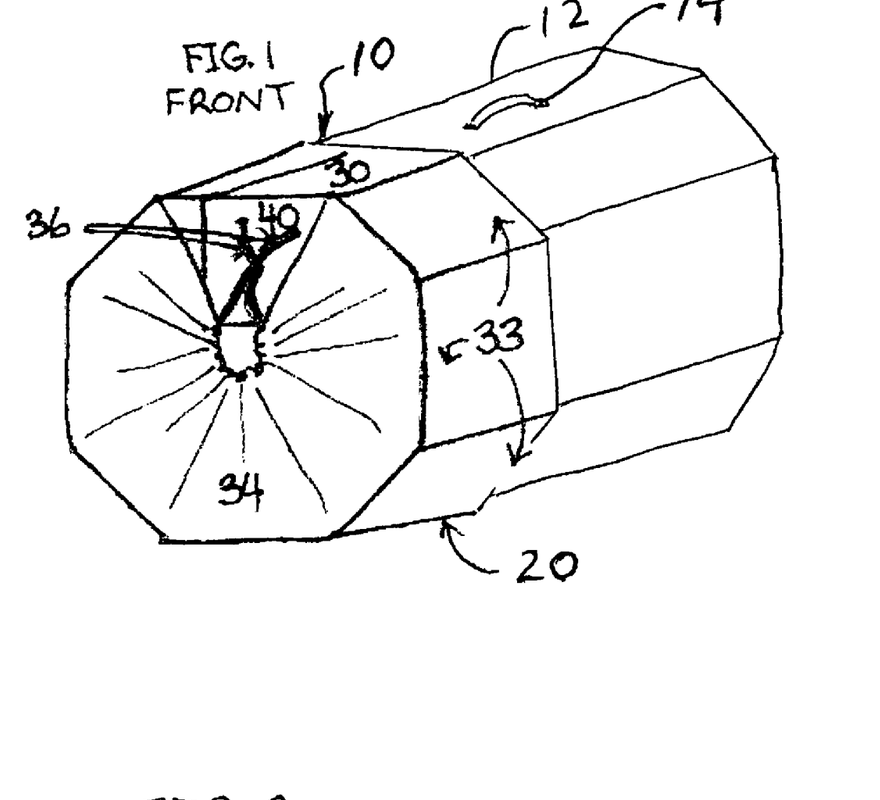
FIG. 1 is a partial, cut away front perspective view of a slip cover for a pet carrier according to the present invention in place on a pet carrier.
Figure 2:
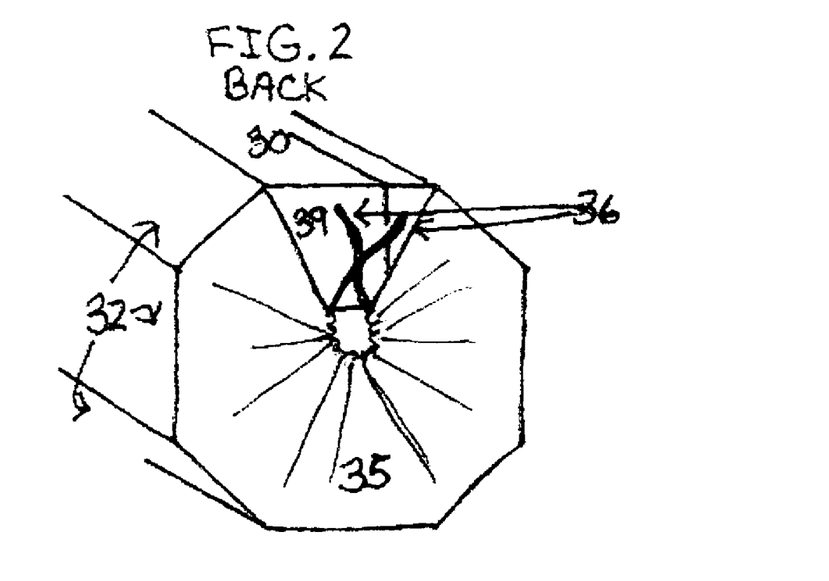
FIG. 2 is a partial, back perspective view of the slip cover of the invention in place on a pet carrier.
Figure 3:
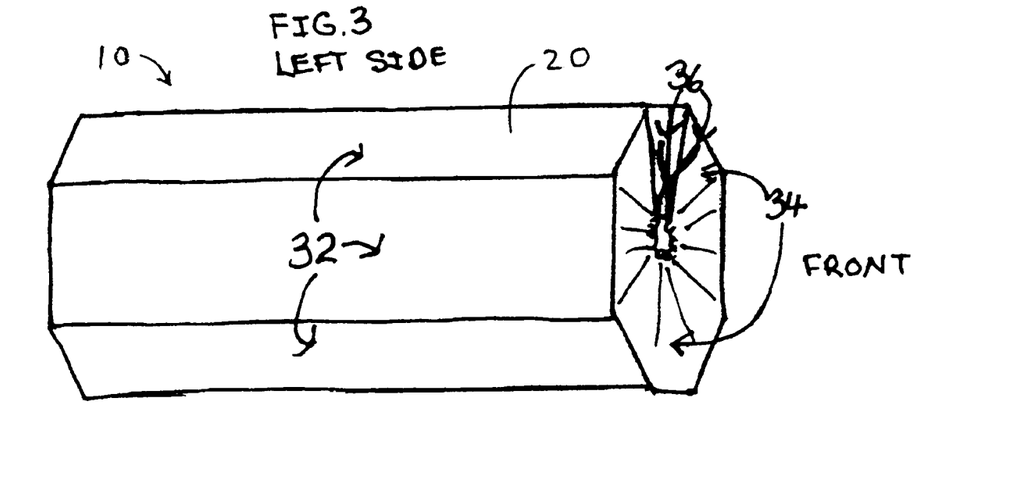
FIG. 3 is a perspective, left side view of the slip cover of the invention in place on a pet carrier.
Figure 4:
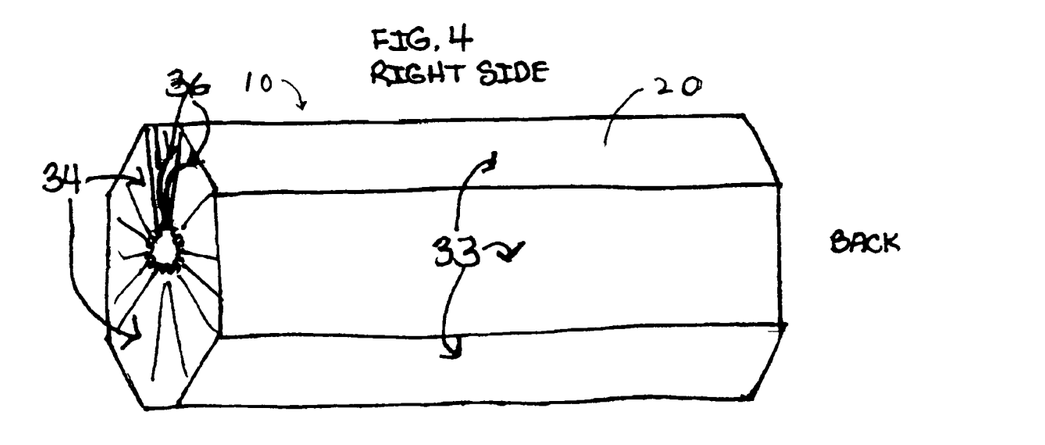
FIG. 4 is perspective, right side view of the slip cover of the invention in place on a pet carrier.

Referring to FIG. 1, there is shown a perspective view of an apparatus incorporating features of the present invention. Although the present invention will be described with reference to the single embodiment shown in the drawings, it should be understood that the present invention can be embodied in many alternate forms of embodiments. In addition, any suitable size, shape or type of elements or materials could be used.

With reference now to the drawings, and in particular to FIGS. 1 through 6 thereof, a new protective encasement or wrap for a pet carrier embodying the principles and concepts of the present invention and generally designated generally by the reference number 10, will be described.

In use, the protective wrap or encasement 10 is designed for covering a commonly available generally rectangular pet carrier 12 having a handle 14 (FIG. 1), the pet carrier being of a type well known in the art, used to conveniently transport a pet. As best illustrated in FIGS. 1 through 8, the protective encasement or wrap for a pet carrier, generally comprises a cover member 20 that when completely wrapped around a pet carrier, and proper measures are taken, forms an interior cavity. The material of the cover member 20 has a top region 30, a bottom region 31, a left side region 32 and a right side region 33 when wrapped around a carrier. The portions 34 (FIG. 1) and 35 (FIG. 2) of the material of the cover member 20 that hang over the front and back ends, respectively, of the carrier may be hemmed, and a drawstring, elastic 36 (or a combination thereof) is inserted through a major portion of the pocket of the hem (but not the full length; some of the portion of the overlapping material will be without the drawstring, elastic, or combination thereof), with the ends of the drawstring, or elastic protruding from the hem at a distance from the side border edges 37,38 of the cover member 20 to allow the overlapped portion of the encasement 10 at the front and back end borders 39,40 of the material to be relatively free from pleats, and to have a generally smooth surface for attaching fabric fasteners, such as Velcro™ closures at those ends. At the top region 30 of the encasement where the side border edges of the encasement overlap, there is a slot 55 that opens into the interior cavity for permitting insertion of a handle of a pet carrier therethrough.

In order to further secure the protective cover in place, fabric fasteners are placed along the end, and on the underside of the overlapping material at one of the side borders, which fall at the top of the carrier. Fabric fasteners are also placed along the topside of the opposite side border of the material, but indented and positioned such that when the carrier is wrapped, the fabric fasteners on both of the side borders meet, and attach. Fabric fasteners also can be placed at the ends of the overlapping material at the end borders, both front and back of the wrap where the drawstring, elastic, or combination thereof cause the material to meet and overlap, and at the top of the carrier where the material overlaps.

Preferably, the cover member 20 is flexible to permit collapsing, rolling, and folding of the cover member 20 for convenient storage of the protective wrap or encasement 10 when not in use covering a pet carrier. In the preferred embodiment, the protective encasement or wrap is constructed to be resistant to water and other fluids passing therethrough into the interior cavity of the cover member 20 so that the protective encasement 10 helps keep a pet carrier within the interior cavity dry during rainy weather. In the preferred embodiment, the protective encasement or wrap 10 is constructed to be resistant to wind passing therethrough. Ideally, the panels of the cover member 20 are constructed from a flexible (ideally woven) fabric material which is breathable to permit air to pass therethrough to provide ventilation to the interior cavity.

With reference to the figures, the cover member 20 is preferably generally rectangular in shape.

Figure 5:
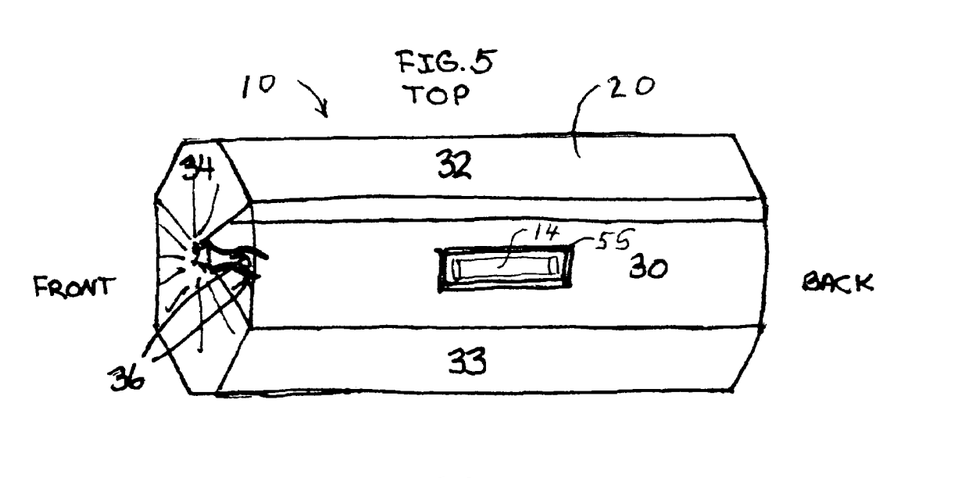
FIG. 5 is a perspective, top view of the slip cover of the invention in place on a pet carrier.
Figure 6:
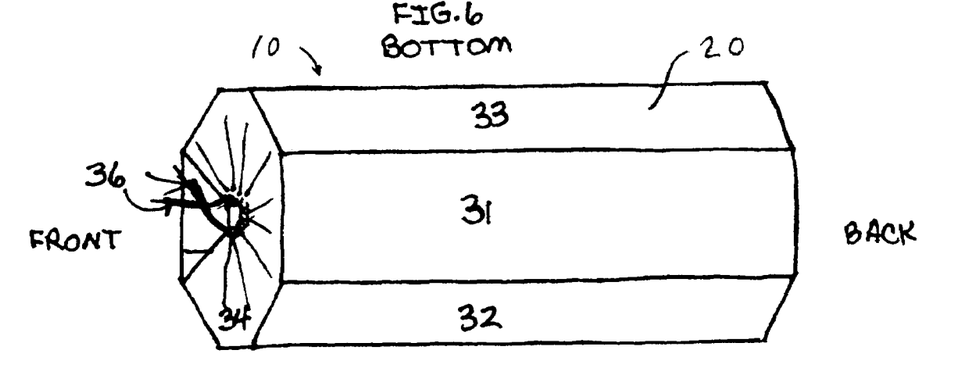
FIG. 6 is a perspective bottom view of the slip cover of the invention in place on a pet carrier.
Figure 7:
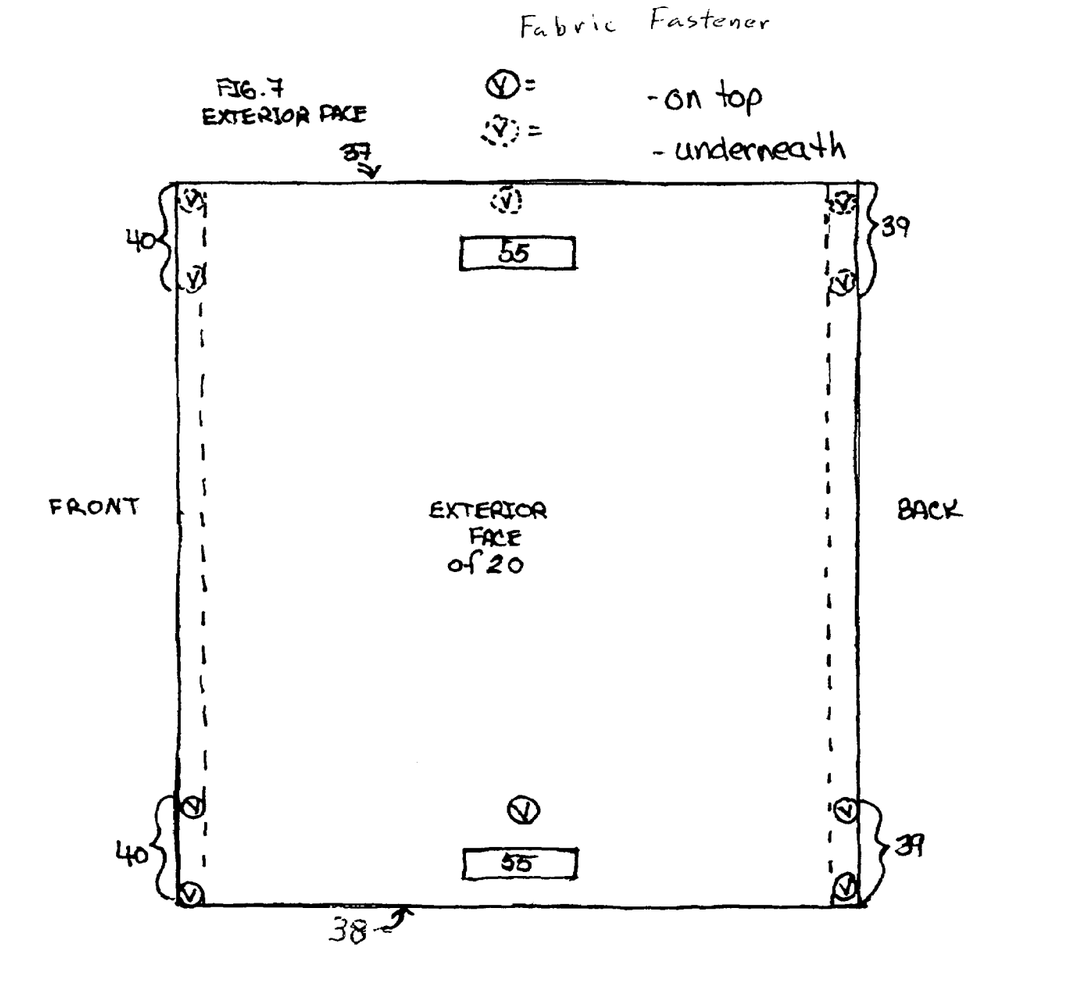
FIG. 7 is a plan view of slip cover of the invention opened up and laying on a flat surface showing the exterior face.
Figure 8:
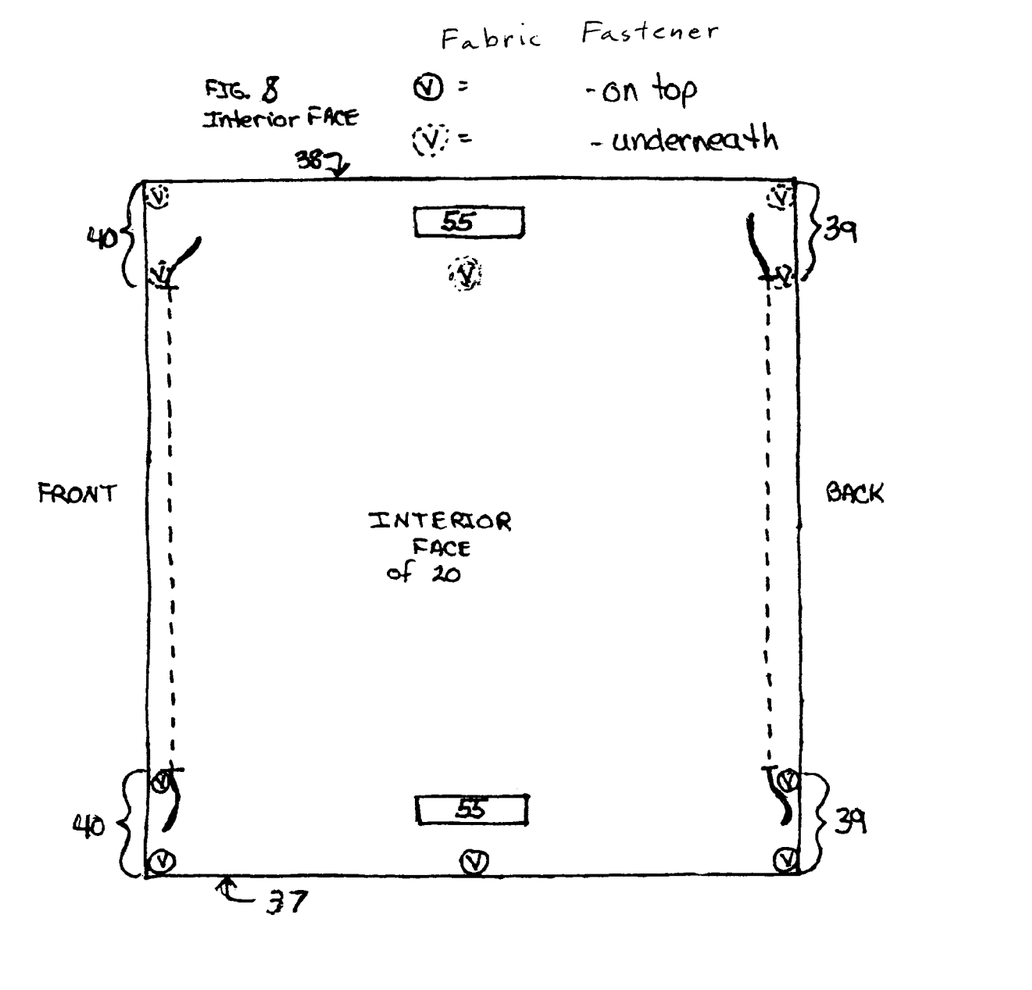
FIG. 8 is a plan view of the slip cover of invention opened up and laying on a flat surface showing the interior face.

As illustrated in FIGS. 5, 7 and 8, the top region 30 has slots 55 opening into the interior cavity of the cover member 20 permitting insertion of a top carrying handle of a pet carrier within the interior cavity. Preferably, the slots 55 are centrally positioned on the portions of the side border ends of the cover member 20 which fall on the top region 30 for proper insertion of the handle of a pet carrier therethrough. Ideally, the slots 55 are generally shaped as elongate oblongs with their lengths being extended substantially parallel to the sides of the pet carrier.

As illustrated in FIG. 7, the cover member is shown opened completely and laying flat with the exterior face showing. As illustrated in FIG. 8, the cover member is shown opened completely and laying flat with the interior face showing.

As illustrated in FIG. 1, the drawn closure at the front end of the encasement and carrier, provides a front opening into the interior cavity for permitting easy access to a frontal door opening of a pet carrier, when proper measures are taken. This permits access of the frontal opening of the pet carrier without having to remove the protective encasement 20 from the pet carrier.

In use, the cover member 20 is opened and placed on a generally flat surface, with the outer surface of the protective encasement 10 closest to, and in contact with the floor. The pet carrier is then placed on top of the protective encasement, generally in the center of the material, and with the door of the carrier facing the front edge border of the cover member 20 (that is one of the sides with the drawstring, elastic, or combination thereof) The side edge borders of the protective encasement are then brought up and around the sides of the carrier, with the side border ends overlapping. A hand is put through the slots near the side end borders and the handle of the carrier is pulled through one slot, then the other, taking care to put the side end border with the fabric closures facing outward over the handle first, then place the side end border with the fabric fastener closures facing downward next. All of the fabric closures are lined up, and pressure is applied until they are attached. The draw string, elastic, or combination thereof is pulled at the back of the carrier tightly, until the desired size of the opening is achieved, and locked in place, or ends tied together. The draw string, elastic, or combination thereof is pulled at the front of the carrier tightly, until the size of the opening that is desired has been achieved, and locked in place, or the ends tied together.

As to a further discussion of the manner of usage and operation of the present invention, the same should be apparent from the above description. Accordingly, no further discussion relating to the manner of usage and operation will be provided.

Thus, advantageously, the present invention provides a new protective wrap for a pet carrier which includes an encasing member having sufficient size that when completely wrapped around the pet carrier, and when appropriate measures are taken forms an interior cavity. At the front and back end border of the material, the opening can be draw closed creating an opening of variable size. At the front end of the carrier, the opening can be such that when not completely closed, an opening into the interior cavity can be created permitting for the opening of the carrier door, insertion of a hand to pet the animal, provide more air circulation, insertion of any items necessary or even removal of the pet from the carrier without having to remove the protective wrap. The material at the side borders of the portion that overlaps on the top of the carrier also includes a slot that opens into the interior cavity for permitting insertion of a handle of a pet carrier therethrough. The encasement member is formed of a piece of material large enough so that when the material is placed on a flat surface, and the carrier is placed in the center of the material, the material can be completely wrapped around the entire carrier, and when appropriate measures are taken, forms an inner cavity around the said carrier.

With respect to the above description then, it is to be realized that the optimum dimensional relationships for the parts of the invention, to include variations in size, materials, shape, form, function and manner of operation, assembly and use, are deemed readily apparent and obvious to one skilled in the art after reading the description herein, and all equivalent relationships to those illustrated in the drawings and described in the specification are intended to be encompassed by the present invention.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A combination of a pet carrier and a protective encasement for the pet carrier, comprising:
   a pet carrier having rigid walls and sides, with an interior and a door opening for access to the interior of the pet carrier, and on a top side of the pet carrier a handle pivotally mounted to said top side of said pet carrier, said handle being elongated for gripping by a hand of a user, and
   said protective encasement surrounding said pet carrier, and said protective encasement comprising:
   a wrap member having a piece of material large enough to wrap completely around the pet carrier and said wrap member having a front end border, a back end border, and a pair of side borders; and
   an end closure apparatus for pulling together one of front and back end borders of the wrap member, so that said wrap member, when wrapped around said pet carrier and ends borders are drawn, and sufficient overlap of side borders of material are fastened, forms an interior cavity, and an opening in said interior cavity, said opening being substantially closed to protect an animal in said pet carrier and said opening being opened to permit access to said door; whereby said animal may be reached while inside, placed in and removed from said pet carrier via said door and said opening, without removing said protective encasement from said pet carrier;
   wherein overlapping portions of the material at each side border have a slot opening into said interior cavity, and when assembled the slot openings overlap and align for permitting insertion of an elongate handle of the pet carrier therethrough.

2. The combination of claim 1, wherein said slot has a generally elongate oblong shape for permitting the hand of the user to reach through the slot and grasp the handle for pulling said handle through said slot upon placement of said encasement around said pet carrier.

3. The combination of claim 1, wherein said wrap member is generally rectangular.

4. The combination of claim 1, wherein said slot is positioned on said overlapping portions near said side borders of the material, where the material is covering the top of the carrier.

5. The combination of claim 1, wherein the length of said slot extends substantially parallel to the sides of the carrier.

6. The combination of claim 1 wherein the material flexible to permit collapsing, rolling, or folding of said encasement for storage and transport when said encasement is not in use.

7. The combination of claim 1, wherein said wrap member is resistant to water and wind passing therethrough.

8. The combination of claim 1, wherein said wrap member is comprised of a flexible fabric material, wherein said fabric material permits air to pass therethrough.

9. The combination of claim 1, wherein said end closure apparatus comprises a drawstring, elastic, or combination thereof for pulling together one of front and back end borders of the wrap member.

10. The combination as defined by claim 1, wherein said wrap member extends under a bottom surface of said pet carrier.

11. A protective encasement and a pet carrier comprising an interior and a door opening for permitting access to the interior of the pet carrier, said pet carrier having a handle pivotally mounted to a top wall of said pet carrier, said handle being elongated for gripping by a hand of a user, said protective encasement comprising:
   a flexible encasement having a front end border, a back end border, and a pair of side borders that when wrapped around said pet carrier substantially totally encloses said carrier; said flexible encasement being sized such that when material of said encasement is wrapped around the carrier, there is sufficient overhang at both front and back end borders so as to allow the material of one of said front or back end borders to be drawn together with an end closure apparatus, and when wrapped around the carrier, there is sufficient overlap of side borders of the material, where the material covers the top portion of the carrier, to form a substantially closed enclosure, and an opening in said enclosure, said opening being substantially closed to protect an animal in said pet carrier and said opening being opened to permit access to said door; whereby said animal may be reached while inside, placed in and removed from said pet carrier via said door and said opening, without removing said protective encasement from said pet carrier, said protective encasement being shaped so that when wrapped around the carrier, with an end border opening drawn closed, and fabric closures utilized, a closed interior cavity is formed;
   wherein said overlapping side borders of the material each have a slot opening into said interior cavity, and when assembled the slot openings overlap and align for permitting insertion of an elongate handle of the pet carrier therethrough, said slot being positioned on said overlapping side borders of the material, and wherein the length of said slot extends substantially parallel to said side borders of the carrier, when the carrier is within the encasement.

12. The protective encasement of claim 11, wherein said slot has a generally elongate oblong shape for permitting the hand of the user to reach through the slot and grasp the handle for pulling said handle through said slot upon placement of said encasement around the pet carrier.

13. The protective encasement of claim 11, having end closure apparatus configured so that said front and back end borders of the encasement define an opening at one of front, back or both end borders.

14. The protective encasement of claim 13, wherein said end closure apparatus permit adjustment of position of said borders so as to define openings of variable sizes.

15. The protective encasement of claim 11, wherein said encasement is flexible to permit collapsing, rolling or folding of said encasement.

16. The protective encasement of claim 11, wherein said encasement is resistant to water, and wind passing therethrough; and wherein said encasement is comprised of flexible fabric material, wherein said fabric material permits air to pass therethrough.

17. The protective encasement of claim 11, wherein said end closure apparatus comprises a drawstring, elastic, or combination thereof for pulling together one of front and back end borders of the flexible encasement.

18. A protective encasement and a generally rectangular pet carrier, said pet carrier comprising: an interior and a door opening for permitting access to the interior of the pet carrier, said pet carrier having a handle pivotally mounted to a top wall of said pet carrier, said handle being elongated for gripping by a hand of a user, said protective encasement comprising:

a flexible encasement in the shape of a rectangle having a first side border and a second side border defining first and second opposite sides of said flexible encasement and elongate openings spaced apart from and parallel to said first side border and second side border, said openings overlap and align for receiving said handle of said pet carrier when said encasement surrounds said pet carrier;

an end closure apparatus parallel to at least on of said first and second end borders;

said flexible encasement also having a first side border and a second side border defining third and fourth opposite sides of said flexible encasement, said first side border and a second side border having fabric fasteners along said third and forth opposite sides;

said flexible encasement, when wrapped around said pet carrier substantially totally enclosing said carrier; said flexible encasement being sized such that when material of said encasement is wrapped around the carrier, there is sufficient overhang at both said front and back end borders so as to allow the material of one of said front or back end borders to be drawn together with said end closure apparatus, and when wrapped around a carrier, there is sufficient overlap of side borders of the material, where the material covers the top portion of the carrier, for said side borders to be secured to one another by said fabric fasteners, whereby maid encasement forms a substantially closed enclosure, with an opening in said enclosure, said opening being substantially closed to protect an animal in said pet carrier and said opening being opened to permit access to said door; so that said animal may be reached while inside, placed in and removed from said pet carrier via said door and said opening, without removing said protective encasement from said pet carrier.

19. A combination of a pet carrier and a protective encasement for the pet carrier, comprising:

a pet carrier for transporting an animal within said pet carrier from a first place to a second place, said pet carrier having rigid walls and sides, with an interior and a door opening for access to the interior of the pet carrier, and on a top side of the pet carrier a handle pivotally mounted to said top side of said pet carrier, said handle being elongated for gripping by a hand of a user when carrying said pet carrier with the animal within said pet carrier, and said protective encasement surrounding said pet carrier, and said protective encasement comprising:

a wrap member including a piece of material large enough to wrap completely around the pet carrier, said wrap member having a front end border, a back end border and a pair of side borders;

an end closure apparatus for pulling together one of front and back end borders of the wrap member, so that said wrap member, when wrapped around said pet carrier and ends are drawn, and sufficient overlap of side borders of material are fastened, forms an interior cavity, and an opening in said interior cavity, said opening being substantially closed to protect an animal in said pet carrier and said opening being opened to permit access to said door; whereby said animal may be reached while inside, placed in and removed from said pet carrier via said door and said opening, without removing said protective encasement from said pet carrier, and where overlapping portions of the material at each side border have a slot opening into said interior cavity, and when assembled, the slot openings overlap and align for permitting insertion of said handle of a pet carrier therethrough.

* * * * *